United States Patent
Heine

(10) Patent No.: US 10,057,465 B2
(45) Date of Patent: Aug. 21, 2018

(54) CELL PHONE MOUTH MOUNT

(71) Applicant: Kurt Erwin Heine, Vancouver, WA (US)

(72) Inventor: Kurt Erwin Heine, Vancouver, WA (US)

( * ) Notice: Subject to any disclaimer, the term of this patent is extended or adjusted under 35 U.S.C. 154(b) by 0 days.

(21) Appl. No.: 15/401,444

(22) Filed: Jan. 9, 2017

(65) Prior Publication Data

US 2018/0198968 A1    Jul. 12, 2018

(51) Int. Cl.
| | |
|---|---|
| *H04N 5/225* | (2006.01) |
| *B60R 11/02* | (2006.01) |
| *F16M 13/04* | (2006.01) |
| *G03B 17/56* | (2006.01) |
| *H04M 1/05* | (2006.01) |
| *B60R 11/00* | (2006.01) |

(52) U.S. Cl.
CPC ....... *H04N 5/2252* (2013.01); *B60R 11/0241* (2013.01); *F16M 13/04* (2013.01); *G03B 17/561* (2013.01); *H04M 1/05* (2013.01); *A45F 2200/0516* (2013.01); *B60R 2011/0059* (2013.01); *B60R 2011/0071* (2013.01)

(58) Field of Classification Search
CPC .. H04N 5/2252; H04N 5/2251; G03B 17/561; G03B 17/563; G03B 17/566; G03B 17/568; F16M 13/04; F16M 11/041; A45F 2200/0516; B60R 11/0241; B60R 2011/0059; B60R 2011/0071; B60R 2011/0078; H04M 1/05

USPC .................................................. 348/373, 376
See application file for complete search history.

(56) References Cited

U.S. PATENT DOCUMENTS

| | | | | |
|---|---|---|---|---|
| D203,101 | S * | 12/1965 | Holder | 206/493 |
| 3,418,461 | A * | 12/1968 | Sedlock | F21L 4/00 |
| | | | | 362/191 |
| 4,984,760 | A * | 1/1991 | Cohn | F16M 13/00 |
| | | | | 248/126 |
| 5,941,434 | A * | 8/1999 | Green | A45F 5/02 |
| | | | | 224/195 |
| 9,038,870 | B2 * | 5/2015 | Johnson | A45C 11/00 |
| | | | | 224/181 |
| 9,080,714 | B2 * | 7/2015 | Minn | B60R 11/0241 |
| 9,395,603 | B2 * | 7/2016 | Achenbach | G03B 17/561 |
| 9,426,341 | B1 * | 8/2016 | Baldrige | F16M 11/041 |
| D776,745 | S * | 1/2017 | Bennett | D16/242 |
| D776,746 | S * | 1/2017 | Bennett | D16/242 |
| 9,693,623 | B2 * | 7/2017 | Bryant | A45F 5/021 |
| 9,715,164 | B2 * | 7/2017 | Russell | G03B 17/561 |
| 9,718,412 | B2 * | 8/2017 | Minn | B60R 11/02 |

(Continued)

FOREIGN PATENT DOCUMENTS

CN         205606143 U *   9/2016 ............. F16M 13/04

*Primary Examiner* — John Villecco
(74) *Attorney, Agent, or Firm* — Mark S Hubert

(57) ABSTRACT

A mouth held photographic mount that is angularly adjustable and has two different reconfigurable structures. In either structure a cell phone is held in a rigid horizontal orientation so as to allow video footage to be shot while the mount is held in the photographer's mouth. The first structure uses an elastic strap to constrain the phone and the second structure uses a vertically adjustable elastic clam to constrain the phone. The shock and vibration isolation of the phone is provided by the human body's own suspension mechanism.

10 Claims, 6 Drawing Sheets

(56) References Cited

U.S. PATENT DOCUMENTS

| | | | |
|---|---|---|---|
| 2006/0055821 A1* | 3/2006 | Sousa | G03B 29/00 348/375 |
| 2015/0191124 A1* | 7/2015 | Du | F16M 13/022 248/205.4 |
| 2015/0253651 A1* | 9/2015 | Russell | G03B 17/561 224/181 |
| 2015/0309396 A1* | 10/2015 | Rohrer | G03B 17/561 224/181 |
| 2015/0312446 A1* | 10/2015 | Blackman | H04N 5/2251 348/373 |
| 2015/0316205 A1* | 11/2015 | Bennett | F16M 13/00 224/181 |
| 2016/0266474 A1* | 9/2016 | Russell | G03B 17/561 |
| 2016/0288730 A1* | 10/2016 | Lee | B60R 11/02 |
| 2016/0381259 A1* | 12/2016 | Johnson | F16M 13/02 348/158 |

* cited by examiner

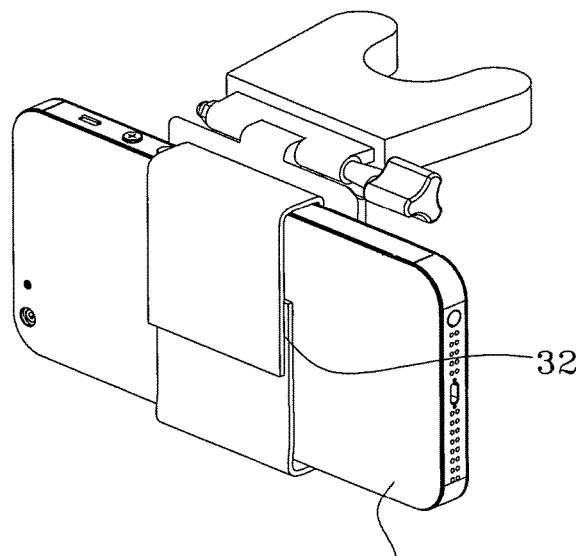
FIG. 7
FIG. 8
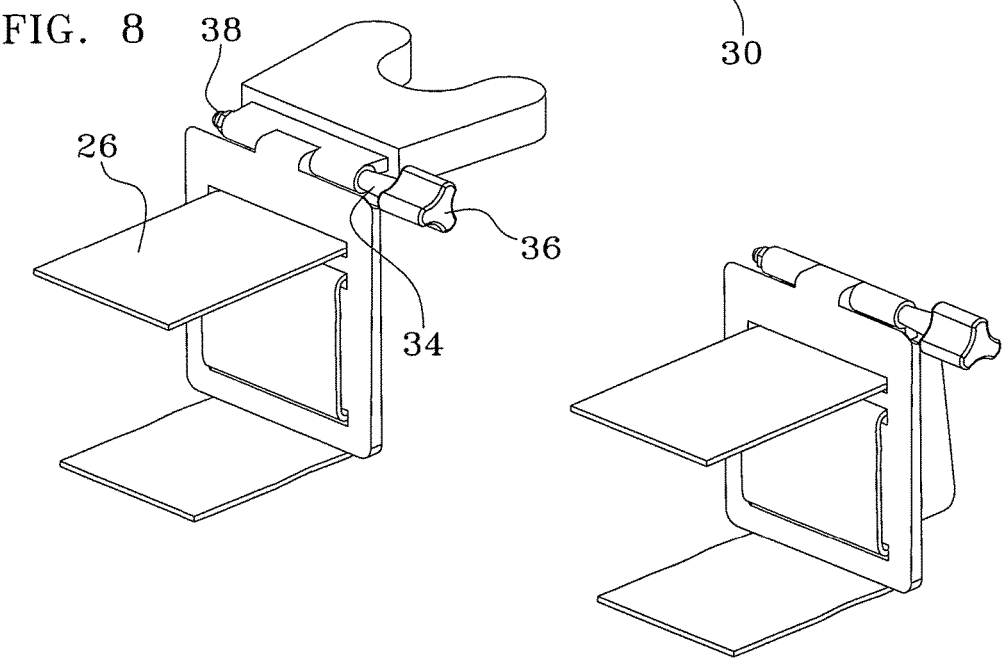
FIG. 9

CELL PHONE MOUTH MOUNT

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to photography, and more particularly to outdoor action photography taken with a cell/smart phone.

BACKGROUND

Taking action photographs and video footage is challenging. However, add in the extra element of the photographer also in motion or participating in the filmed sport, and it becomes extremely tough. While there are all sorts of shock and vibrationally dampened video mounts available to professional film crews, these are extremely expensive, and not readily available to the average sports action photographer or weekend warrior. Without these vibrationally dampened video mounts, the replayed video suffers from a plethora of jerky motions to the point where most viewers will only briefly watch.

Since many sports such as skiing or snow boarding require the cameraman to ride in the near vicinity of the filmed subject the cameraman is also using his own body including his arms and hands to negotiate the terrain. This makes it dangerous and very hard to take good pictures, and even then the resultant video is "shaky." Additionally, cameraman that have to place the camera viewfinder to their eye to frame the shot of the action, are really blind to much of what is going on around them and this can lead to accidents and injuries.

With the advent of personal digital sports photography systems, the photographer can attach a small lightweight digital video camera through a series of different mounts, to a variety of different locations on the sporting equipment and even on the head of the photographer, via a helmet cam. These systems are also equipped with software to minimize the shake in the footage, and the mounts may incorporate some minor vibrational and shock absorbing elements. While these work well to reduce the level of shake in the footage, they do not eliminate it. A problem with these systems is the initial cost and the fact that as they constantly improve, there is the expense of updating. This keeps many out of this market. Another drawback of these systems is that while the camera is affixed to a helmet cam and will rotate with the wearer's head, the wearer is not looking through the viewfinder and does not exactly know what he is photographing. A slight shift in the helmet can aim the camera in a significantly different area that the photographer intends. This can be frustrating as not all actions are repeatable.

Today, more and more people are abandoning their cameras, even digital cameras of recent years, for the camera imbedded in their cell/smart phones and personal computing devices. Everyone has a cell/smart phone. Usually they upgrade every two years so their camera has the latest software and highest resolution, zoom and editing capabilities. Henceforth, an inexpensive vibrational reducing mount for a cell/smart phone that can be used for action video would fulfill a long felt need in the photography industry. This new invention utilizes and combines known and new technologies in a unique and novel configuration to overcome the aforementioned problems and accomplish this.

BRIEF SUMMARY

In accordance with various embodiments, an apparatus for reversibly mounting a cell/smart phone for use as a video action camera with enhanced vibrational isolation capabilities is provided.

In one aspect, a mouth held, universal cell/smart phone mount is provided that can improve the quality of action sports footage. In various embodiments, the mount can be secured to any of the commercially available cell phones in two different ways.

In another aspect, a safe, mouth cell/smart phone mount is provided, capable of offering the user a comfortable photographic experience, without dry mouth and that offers the unexpected result of almost shake free photography.

In yet another aspect, a tooth safe mouth cell/smart phone mount, with reversible interchangeable phone grips, is provided for use in situations where the photographer is subject to movement aside the filmed subject that has considerable accident probability.

In yet another aspect, a personal cell/smart phone mount having an extremely small physical profile such that it can be folded and put into the users pocket.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 7 is a is a front perspective of the strap mount plate (with a cell phone) in the closed position, pivotally attached to the bite plate;

FIG. 8 is a front perspective of the strap mount plate in the open position, pivotally attached to the bite plate;

FIG. 9 is a front perspective of the bite plate pivoted into the closed position behind the strap mount plate;

DETAILED DESCRIPTION OF CERTAIN EMBODIMENTS

Figure 1:
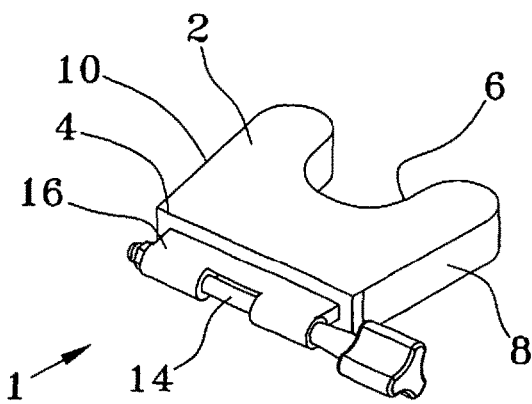
FIG. 1 is a rear perspective view of the mouth mount bite plate.

While various aspects and features of certain embodiments have been summarized above, the following detailed description illustrates at least on exemplary embodiment in further detail to enable one skilled in the art to practice such an embodiment. The described example is provided for illustrative purposes and is not intended to limit the scope of the invention.

In the following description, for the purposes of explanation, numerous specific details are set forth in order to provide a thorough understanding of the described embodiment/s. It will be apparent to one skilled in the art, however, that other embodiments of the present invention may be practiced without some of these specific details. Certain structures and devices may be shown in block diagram form. While various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The term "cell/smart phone" as used herein refers to personal digital electronic communication device with an internalized camera having the ability to capture still and live video footage.

The term "shake" as used herein, refers to unwanted jerks (fast or slow, large or small) of the viewed video that causes the photographed subject to drift or shake in the field of view of the video.

The present invention relates to a novel design for a cell/smart phone hands-free mount that can be temporarily clasped in the mouth, between the photographer's teeth. The best use of this apparatus is to hold a cell phone set in the video mode, into a horizontal orientation and for the photographer to move adjacent and about the subject. This hands free device has a plethora of applications including but not limited to social media discourse, filming of how-to videos, filming while driving, riding bikes, skis, watercraft, skates, skateboards and the like. Simply stated, it acts as a third hand or a personal cameraman.

Looking at FIG. 1, one can see the bite plate 1 that is common to both the first and second embodiments of the mouth mount. This bite plate 1 has a generally planar tooth plate 2 with a linear front edge 4 and a C shaped cutout rear edge 6. The C shaped cutout approximates profile of a human dental arch. The tooth plate 2 has side 8 that may range in thickness from 1/16 of an inch to 3/4 of an inch. Its side edges 10 are not parallel, but rather taper, narrowing in width from the rear edge 6 to the front edge 4. This is to allow engagement on both sides of the tooth plate 2 between all of the teeth yet not force the user to keep his lips stretched in an uncomfortable position. This also minimizes the amount of air that can get into the user's mouth. The material of the bite plate in the preferred embodiment is sterilizable by boiling or placing in alcohol. It will be soft enough to remove the potential of chipping teeth and to offer some cushioning. It will have a low coefficient of heat retransfer so as not to transmit extreme heat or cold to the user's teeth. Preferably, it will not be slick or slippery when wet or have a high gloss finish. It will be hypoallergenic. It will not have a minimal odor and taste. It will be non-metallic on the outer tooth contacting surfaces to eliminate the creation of an electric cell in the mouth between teeth with fillings, denture wires, crowns and the like. It will have some flexibility with the potential for heat molding to accommodate the dental arch profile of the user. It will have a compressible top surface to minimize point loading on individual teeth and tooth spikes. In the preferred embodiment the tooth plate will be made with a rigid polymer backbone (HDPE underlying plate) covered with a thicker, compressible outer rubber-like coating (exoskeleton) of medical grade anti microbial silicone or an equivalent It is important to note that the cutout portion defining the cutout rear edge is critical in keeping the mass of the device low and in allowing flexibility in the sides of the bite plate that lie on opposite sides of the dental arch.

Figure 2:
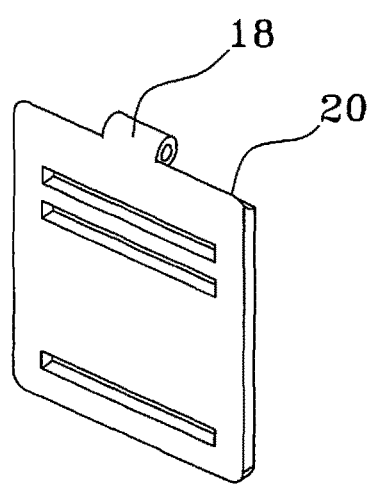
FIG. 2 is a front perspective of the strap mount plate.
Figure 3:
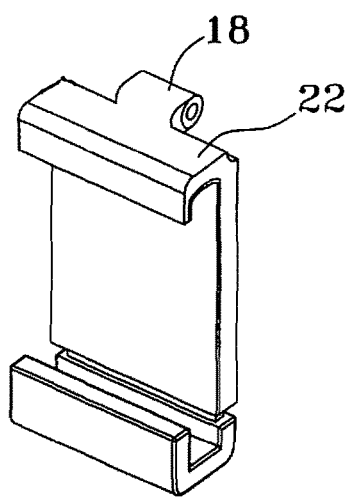
FIG. 3 is a front perspective of the clamp mount plate.
Figure 5:
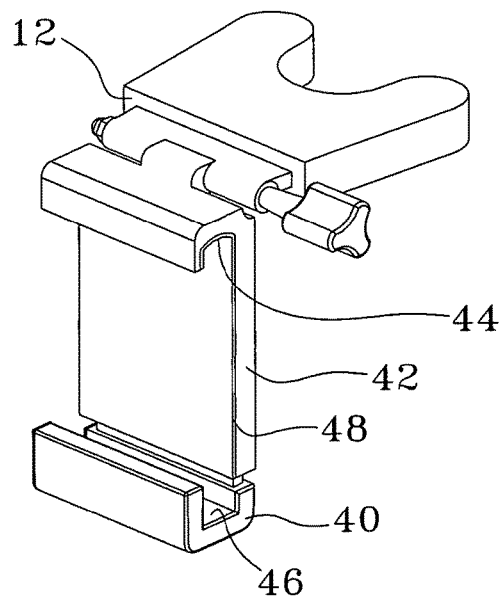
FIG. 5 is a front perspective of the clamp mount plate in the retracted position, pivotally attached to the bite plate.

Onto the front face of the tooth plate 12 (FIG. 5) is affixed a first portion of a pin hinge barrel 14. This is comprised of two hollow outer cylindrical extensions 16 with linear through bores having a common longitudinal axis. These are affixed in a spaced configuration so as to accommodate the second portion of a pin hinge barrel 18 therebetween. The second portion of a pin hinge barrel 18 can be seen extending from the top edge of the strap plate 20 (FIG. 2) or the top edge of the clamp plate 22 (FIG. 3). With this design, the second portion of a pin hinge barrel may be rotated 180 degrees (reversed) and inserted therebetween the two hollow outer cylindrical extensions 16 such that the strap plate 20 may reside in front of the strap, or behind the strap. These two orientations may be used with different phones or based on the preference of the photographer.

Figure 6:
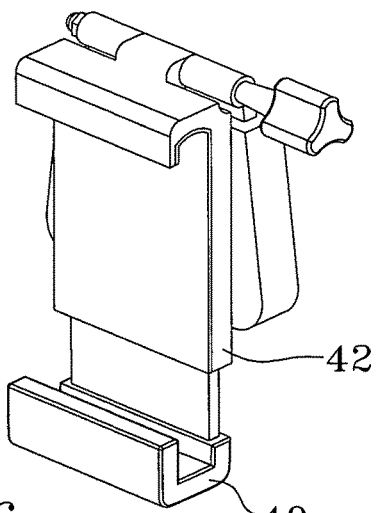
FIG. 6 is a front perspective of the clamp mount plate in the extended position, pivotally attached to the bite plate.

All linear through bores when the bite plate 1 and either of the clamp mount plate 22 (FIGS. 4, 5 and 6) or strap mount plate 20 (FIGS. 7, 8 and 9) are affixed together, share a common linear axis. In this way when hinge pin 14 is progressively inserted through the first and second portions of the pin hinge barrel, the assembled two plates will be able to pivot with respect to the linear axis of the hinge pin 14.

The strap mount plate 20 is but a rectangular planar plate with three parallel linear slots 24 formed therein two of which reside in close proximity to each other adjacent the top edge of the plate and the third of which resides adjacent the bottom edge of the plate. The length of these slots 24 slightly exceeds the width of the elastic attachment strap 26. (FIG. 8) The attachment strap 28 is affixed, weaving its length through the three slots 24 such that its two ends may be brought beyond the front side of the plate and wrapped around the width of the cell phone 30 in an overlapping configuration back onto itself (FIG. 7) and affixed. The connection of the interior face and exterior face of the attachment strap 26 is accomplished by engaging hook and loop fastener surfaces 32 thereon the ends of the attachment strap 26.

Figure 10:
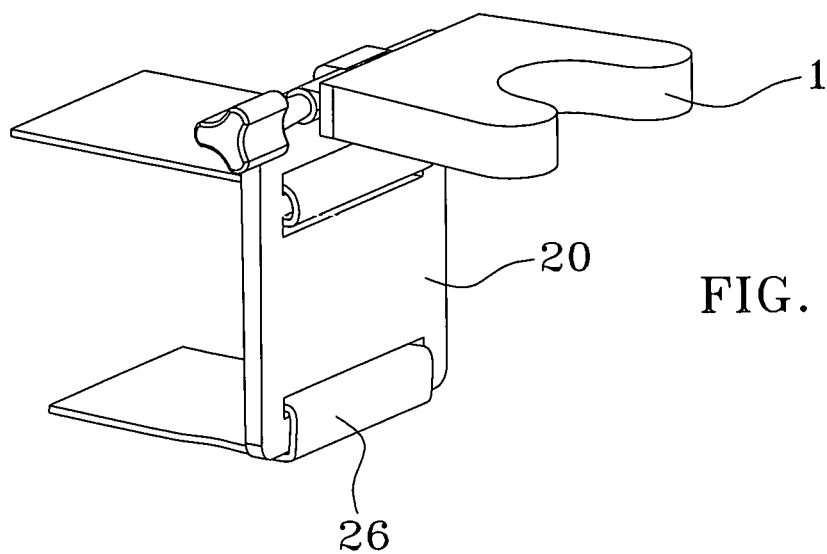
FIG. 10 is a rear perspective of the strap mount plate bite plate in the open position, pivotally attached to the bite plate.
Figure 11:
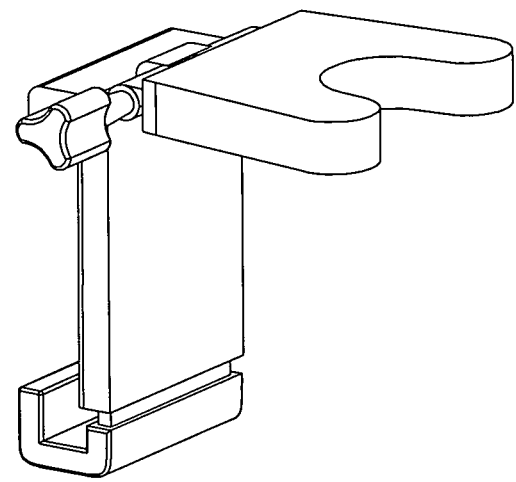
FIG. 11 is a rear perspective of the clamp mount plate in the retracted position, pivotally attached to the bite plate.

FIG. 10 shows a rear perspective view of the method of weaving of the attachment strap 26 through the strap mount plate 20.

The strap mount plate 20 is affixed to the bite plate 1 via the insertion of the hinge pin 14 through the common linear axis of the first and second portions of the pin hinge. The distal end of the hinge pin 14 is threaded and when the pin hinge is inserted therein, it extends beyond the first portion of the hinge pin 16 enough to threadingly engage a nut 38 thereon. The proximal end of the hinge pin 14 has a stepped diameter 34 that forms a shoulder that exceeds the internal diameter of the bore in the first portion of the pin hinge 16 such that upon insertion, the shoulder abuts the first portion of the pin hinge 16. At the proximal end of the hinge pin resides a thumb screw 36. When the hinge pin 14 in inserted into the pin hinge assembly and the nut 38 engaged, turning the thumbscrew 36 clockwise will increase the compression and frictional resistance between the leaves (first and second portions) of the pin hinge so as to lock the angle between the tooth plate 2 and the bite plate 1.

In use, the photographer needs only strap the phone horizontally onto the strap plate 20 with the attachment strap 26 such that none of the lenses are covered, then attach the two ends of the attachment strap 26 snuggly onto the phone 30 via the hook and loop fasteners. (FIG. 7) A few tests will reveal the field that is seen with that cell/smartphone angle and the angle between the plates can be increased or decreased immediately. FIG. 9 shows this embodiment where the thumbscrew has been relaxed so as to allow the two plated to reside adjacent for storage.

Looking at FIGS. 4, 5, 6, 11 and 14, the preferred embodiment clamp mount plate 22 can be seen to comprise at least one vertically extendable lower arm 40 that is elastically retractable within an upper housing 42. The second portion of the pin hinge 18 extends from the upper housing 42. Again, since the first and second portions of the pin hinge barrel are affixed in an interleaved, configuration with the second portion pin hinge barrel 18 therebetween the two first portions, the second portion of a pin hinge barrel may be reversed by rotating it 180 degrees and inserting it therebetween the two hollow outer cylindrical extensions 16 such that the clamp mount plate 22 may reside in front of cell phone or behind it. These two orientations may be used with different phones or based on the preference of the photographer.

The lower arm 40 is retracted by a retraction assembly 50 (FIG. 13) (preferably an elastic) affixed between it and the upper housing 42, that resides in the upper housing as is well known by one of ordinary skill in the art. The upper housing 42 and the lower housing 40 each have an extension perpendicular to their planar front faces that forms an upper U shaped channel 44 and a lower U shaped channel 46. These U shaped channels are opposing so as to retain a cell phone by it side edges there between. There is a non-slip, grippable surface coating 48 on the front faces of the upper housing 42 and the lower housing 40 to securely engage the cell/smart phone.

Figure 14:
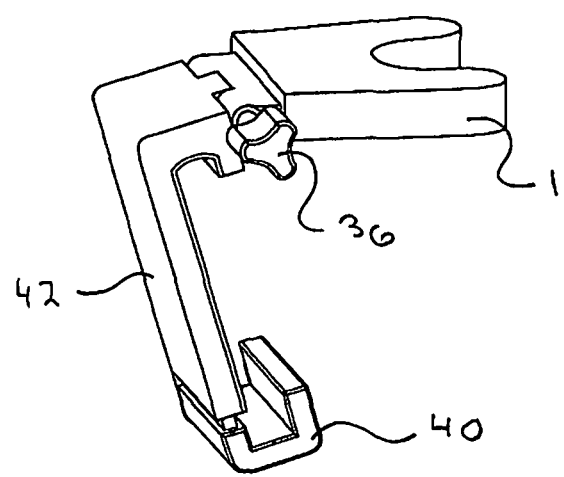
FIG. 14 is a side perspective view of the preferred embodiment clamp mount plate configuration pivotally attached to the bite plate.

Although depicted as having but a single arm, the clamp mount plate 22 in alternate embodiments may utilize more than one arm. The thickness of the arm may also vary with the design from a planar design to a wire frame design. In the preferred embodiment, as seen in FIG. 14, the clamp mount plate's arm resides in front of the phone rather than between the phone and the photographer. The upper housing and said lower arm of said clamp mount plate, form a C shaped assembly with its concavity facing toward the bite plate.

The phone can be turned so as to use its front or rear camera as often these use different lenses or are capable of different resolutions. By having the phone between the clamp mount plate 22 and the bite plate the possibility of having the phone being thrown clear of the photographer in the event of a crash, are minimalized. More importantly though, with this orientation, the clamp mount plate's arm will reside along and contact the back case of the phone rather than the front glass face of the phone, thereby avoiding scratches to the front face. (It is expected that the back of the phone will be facing outward and its rear camera will be utilized for filming.)

It is also to be noted, that depending upon the size of the phone, the phone may be rotated 90 degrees in the clamp mount plate so as to allow it to grasp the camera from its top and bottom edges rather than its sides. This would be 90 degrees rotated from the embodiments of FIGS. 12 and 13. Although not preferable for filming video, it leaves the photographer an option for their visual format.

Figure 4:
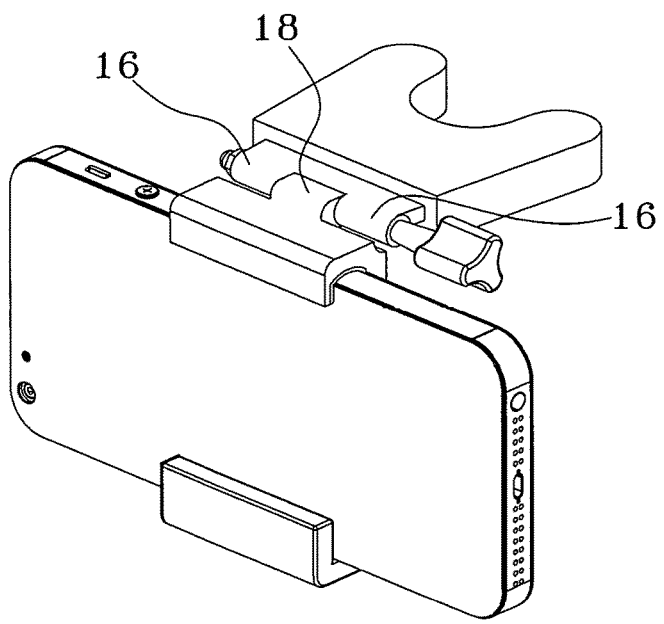
FIG. 4 is a front perspective of the clamp mount plate (with cell phone) pivotally attached to the bite plate.
Figure 12:
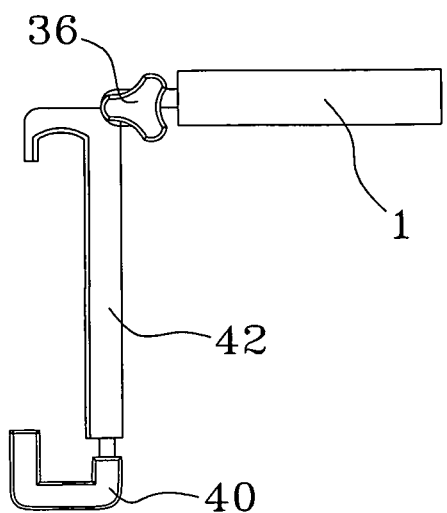
FIG. 12 is a side view of the clamp mount plate in the retracted position, pivotally attached to the bite plate.
Figure 13:
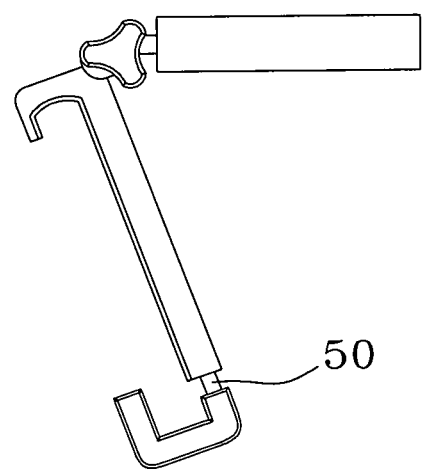
FIG. 13 is a side view of the clamp mount plate in the retracted, angled position, pivotally attached to the bite plate.

The assembly of the second embodiment is substantially the same as that of the first embodiment discussed above. The use of the second embodiment differs only in the way the cell phone 30 is attached (FIG. 4). Here a downward force is placed on the lower housing 40 so as to increase the distance between the upper U shaped channel and the lower U shaped channel enough for the cell phone to be inserted into the channels. (FIG. 6) The force is removed and the lower housing 40 is retracted under spring force upward so as to contact and secure the cell phone. The thumbscrew 36 is tensioned when the correct angel between the bite plate 1 and the clamp mount plate 22 is achieved. (FIGS. 12 and 13).

An additional benefit of the mouth mount 2 is that in the event of a photographer crashing, if the mouth mount 2 is struck, there are two protections offered to the photographer. First, the bite plate can slide back into the mouth and not strike the teeth. In mounts that utilize a snorkel style mount, any shock to the front to the camera/camera mount is directly transmitted to the gums and teeth, With the present device that is not the case, as the bite plate 4 slides between the teeth to absorb the shock. Second, the strap mount plate 6 or the clamp mount plate 22 flex at their pivotal connection to the bite plate 4 so as to minimized any injury to the chin.

There are two unexpected results of this device. First, is that the human mind anticipates any shocks that the body is about to encounter and adjusts the tension in the knees, waist, hips, stomach, shoulders, chest and neck so that the shock seen by the human body at the farthest point from the source of the shock transmission (generally the ground) is severely isolated and dampened. This results in the head being the perfect mounting point for the direct mounting of an action camera to minimize the "shake." (As opposed to using the head as an indirect mount for an action camera via a helmet.)

Second, experience has taught that video taken from a mouth held cell/smart phone mount tracks the action better, and frames the shot much better than does any other non viewfinder aligned shot. For reasons unknown at this time to the inventor, when the cell/smart phone is held in the mouth compared to those taken hand-held or from a helmet mount, the action figure is much more likely to be centrally framed within the shot. Although just a theory, the inventor believes that with the cell/smart phone centered within the mouth such that the axial centerline of the cell/phone runs vertically through the longitudinal axis of the photographer's nose, the subject is properly framed because photographer always tries to keep his eyes equally on the subject matter. This corresponds to constant alignment of the photographer's nose to the shortest line to the subject.

Lastly, unlike a tooth protector or boxer's mouth-guard, the bite plate does not draw in the wearer's *salvia* between the teeth, gums and inside of the guard, causing dry mouth. In colder outdoor, dry climates, as is encountered when filming snowboarders and skiers, dry mouth is already a concern without a mouth mounted camera mount.

While certain features and aspects have been described with respect to exemplary embodiments, one skilled in the art will recognize that numerous modifications are possible. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although two exemplary embodiments are described above, it will be appreciated that the invention is intended to cover all modifications and equivalents within the scope of the following claims.

Having thus described the invention, what is claimed as new and desired to be secured by Letters Patent is as follows:

1. A photographer's interchangeable mouth mount for a cell phone comprising;
   a generally planar bite plate having a linear front edge and rear edge having a cutout with an edge profile that approximates the shape of a human dental arch;
   a generally planar removable strap mount plate having an upper edge and a lower edge and at least two parallel linear slots formed thereon said strap mount plate between said upper edge and said lower edge, wherein said upper edge is pivotally connected to said front edge of said bite plate; and
   an elastic attachment strap having a first end and a second end with engageable hook and loop fastener surfaces thereon said ends.

2. The photographer's interchangeable mouth mount of claim 1 wherein said strap mount plate is reversible and said attachment strap is affixed to said strap mount plate by a weaving through said linear slots such that its first and second end may extend beyond a front side of said strap mount plate of a length sufficient to wrap around the width of a cell phone in an overlapping configuration back onto itself for affixation to said hook and loop fastener surfaces.

3. The photographer's interchangeable mouth mount of claim 2 wherein a number of said linear slots is three.

4. The photographer's interchangeable mouth mount of claim 3 further comprising a hinge pin; and
   wherein said bite plate has a first section of a hinge pin barrel extending therefrom said front edge, and said strap mount plate has a second section of a hinge pin barrel extending from a top edge, and
   wherein said hinge pin barrels have matingly sized linear bores there through for the progressive insertion of said hinge pin there through all bores so as to make said bite plate and said strap mount plate in a pivotally engaged about said hinge pin.

5. The photographer's interchangeable mouth mount of claim 4 further comprising:
   a threaded nut; and
   a thumb screw;
   wherein said hinge pin has a first end and a second end, said first end having threads formed thereon and said second end has a shoulder formed thereon having a diameter greater than an internal diameter of said bore in the first portion of the pin hinge; and
   wherein said nut is threadingly affixed to said first end of said hinge pin, and said thumb screw is affixed to said second end of said hinge pin adjacent said shoulder.

6. A photographer's interchangeable mouth mount comprising:
   a generally planar bite plate having a linear front edge and rear edge having a cutout with an edge profile that approximates the shape of a human dental arch;
   a clamp mount plate having an extendable lower arm, an upper housing and an elastic assembly connected between said upper housing and said lower arm so as to elastically retractably extend said lower arm below said upper housing;
   a hinge pin; and
   wherein said bite plate has a first section of a hinge pin barrel extending therefrom said front edge, and said clamp mount plate has a reversible second section of a hinge pin barrel extending from a top edge, and
   wherein said hinge pin barrels have matingly sized linear bores there through for the progressive insertion of said hinge pin there through all bores so as to make said bite plate and said clamp mount plate in a pivotally engaged about said hinge pin.

7. The photographer's interchangeable mouth mount of claim 6 further comprising a hinge pin; and
   wherein said bite plate has a first section of a hinge pin barrel extending therefrom said front edge, and said clamp mount plate has a second section of a hinge pin barrel extending from a top edge, and
   wherein said hinge pin barrels have matingly sized linear bores there through for the progressive insertion of said hinge pin there through all bores so as to make said bite plate and said clamp mount plate in a pivotally engaged about said hinge pin.

8. The photographer's interchangeable mouth mount of claim 7 further comprising:
   a threaded nut; and
   a thumb screw;
   wherein said hinge pin has a first end and a second end, said first end having threads formed thereon and said second end has a shoulder formed thereon having a diameter greater than an internal diameter of said bore in the first portion of the pin hinge; and
   wherein said nut is threadingly affixed to said first end of said hinge pin, and said thumb screw is affixed to said second end of said hinge pin adjacent said shoulder.

9. A photographer's reversible, mouth mount for a cell phone comprising;
   a generally planar bite plate having a linear front edge and rear edge having a cutout with an edge profile that approximates the shape of a human dental arch;
   a clamp mount plate having an extendable lower arm, an upper housing and an elastic assembly connected between said upper housing and said lower arm so as to elastically retractably extend said lower arm below said upper housing;

a hinge pin; and wherein said bite plate has a first section of a hinge pin barrel extending therefrom said front edge, and said clamp mount plate has a second section of a hinge pin barrel extending from a top edge, and wherein said hinge pin barrels have matingly sized linear bores there through for the progressive insertion of said hinge pin there through all bores so as to make said bite plate and said strap mount plate in a pivotally engaged about said hinge pin; and wherein said second section of said hinge pin barrel may be reversibly, pivotally connected to said bite plate.

10. The reversible, mouth mount for a cell phone of claim 9 wherein said upper housing and said lower arm of said clamp mount plate, form a C shaped assembly with a concavity facing toward said bite plate.

\* \* \* \* \*